United States Patent
Koudo et al.

(10) Patent No.: US 10,923,014 B2
(45) Date of Patent: *Feb. 16, 2021

(54) LIQUID CRYSTAL DISPLAY DEVICE

(71) Applicants: Panasonic Liquid Crystal Display Co., Ltd., Himeji (JP); Pasona Knowledge Partner Inc., Osaka (JP)

(72) Inventors: Toshikazu Koudo, Hyogo (JP); Masahiro Ishii, Hyogo (JP); Katsuhiro Kikuchi, Hyogo (JP); Ikuko Mori, Hyogo (JP)

(73) Assignees: Panasonic Liquid Crystal Display Co., Ltd., Hyogo (JP); Pasona Knowledge Partner Inc., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/837,744

(22) Filed: Apr. 1, 2020

(65) Prior Publication Data

US 2020/0226968 A1    Jul. 16, 2020

Related U.S. Application Data

(63) Continuation of application No. 16/562,106, filed on Sep. 5, 2019, now Pat. No. 10,643,518, and a (Continued)

(30) Foreign Application Priority Data

Nov. 25, 2016  (JP) .............................. JP2016-229154

(51) Int. Cl.
*G09G 3/20*      (2006.01)
*G09G 3/34*      (2006.01)
(Continued)

(52) U.S. Cl.
CPC ......... *G09G 3/2003* (2013.01); *G06F 3/1446* (2013.01); *G09G 3/36* (2013.01);
(Continued)

(58) Field of Classification Search
None
See application file for complete search history.

(56) References Cited

U.S. PATENT DOCUMENTS

2010/0002018 A1    1/2010  Hirata
2010/0118006 A1    5/2010  Kimura
2013/0229594 A1*   9/2013  Son .................. G02F 1/133606
                                                        349/61

FOREIGN PATENT DOCUMENTS

JP        2007-310161        11/2007

* cited by examiner

*Primary Examiner* — Yanna Wu
(74) *Attorney, Agent, or Firm* — Hamre, Schumann, Mueller & Larson, P.C.

(57) ABSTRACT

A liquid crystal display device comprises: a first display panel displaying a color image; a second display panel displaying a monochrome image; and an image processor generating first image data corresponding to the color image and second image data corresponding to the monochrome image based on an input video signal. The image processor generates the first image data and the second image data such that a graph representing transmittance of the first display panel for input gradation corresponding to the input video signal and a graph representing transmittance of the second display panel for the input gradation corresponding to the input video signal intersect each other at predetermined input gradation.

6 Claims, 13 Drawing Sheets

Related U.S. Application Data continuation of application No. 15/821,204, filed on Nov. 22, 2017, now Pat. No. 10,446,072.

(51) Int. Cl.
　　*G09G 3/36*　　　(2006.01)
　　*G06F 3/14*　　　(2006.01)
(52) U.S. Cl.
　　CPC ......... *G09G 3/3607* (2013.01); *G09G 3/3648* (2013.01); *G09G 3/3426* (2013.01); *G09G 2300/023* (2013.01); *G09G 2300/0452* (2013.01); *G09G 2320/0242* (2013.01); *G09G 2320/066* (2013.01); *G09G 2320/0666* (2013.01); *G09G 2320/0673* (2013.01)

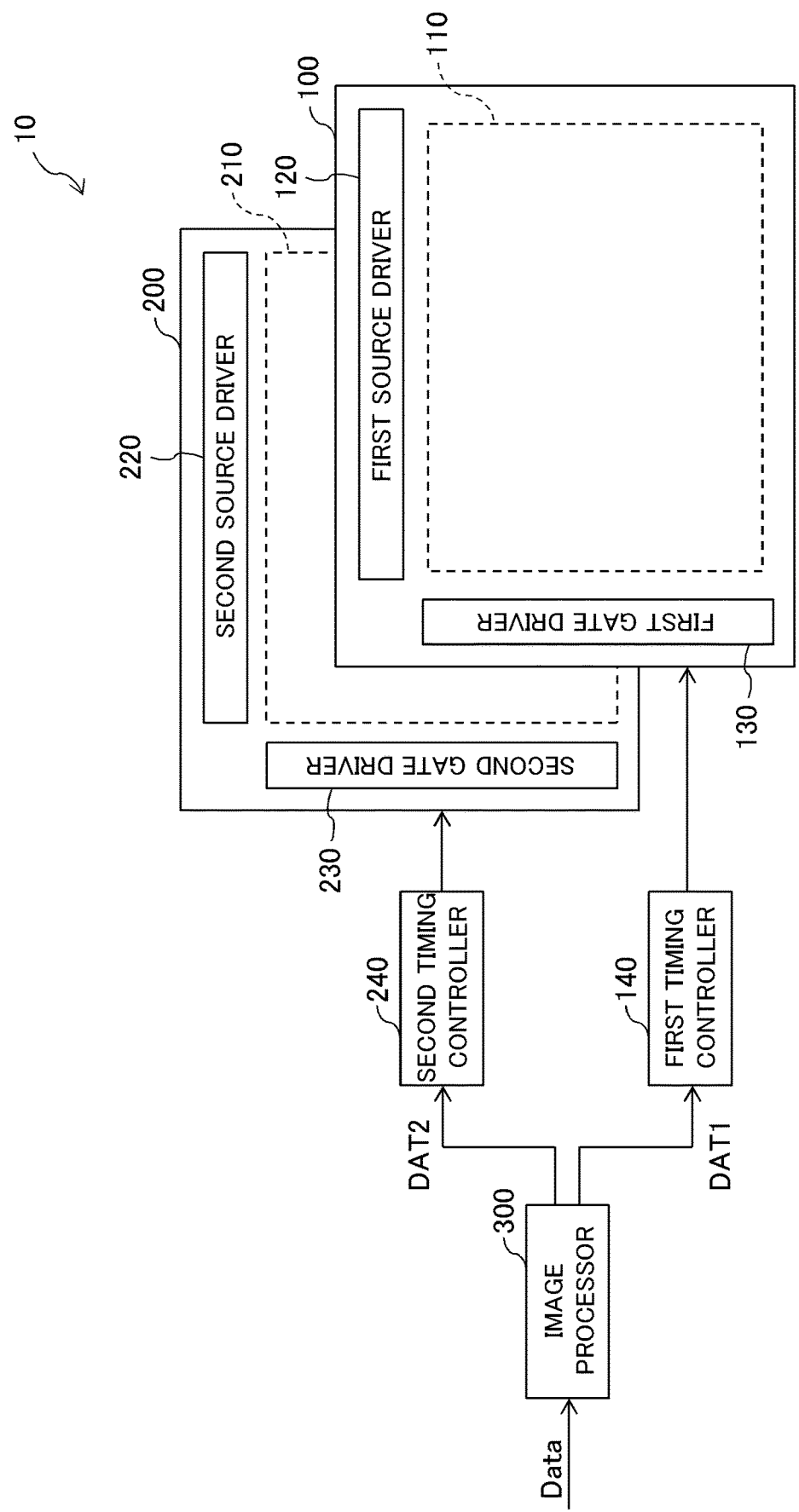

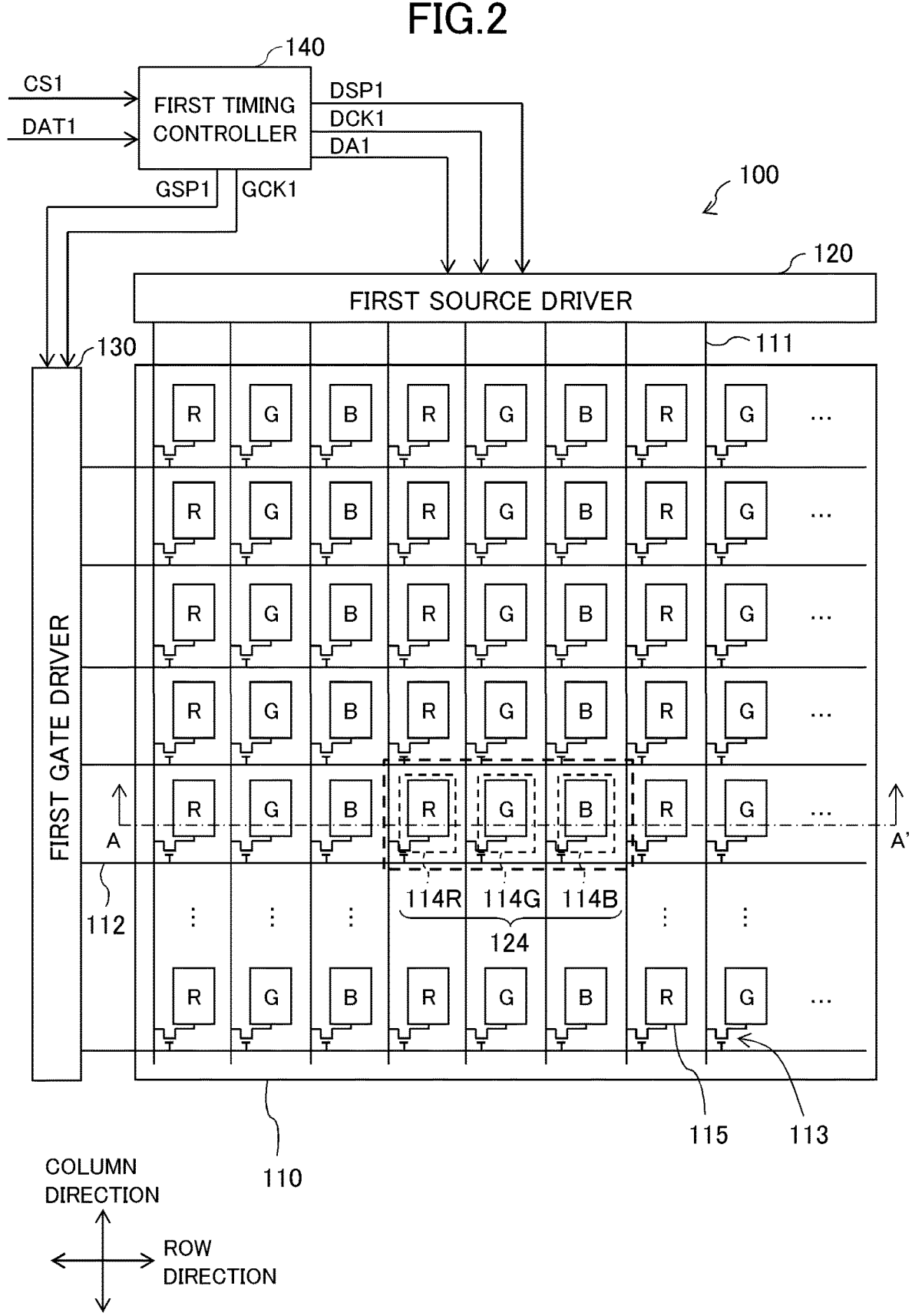

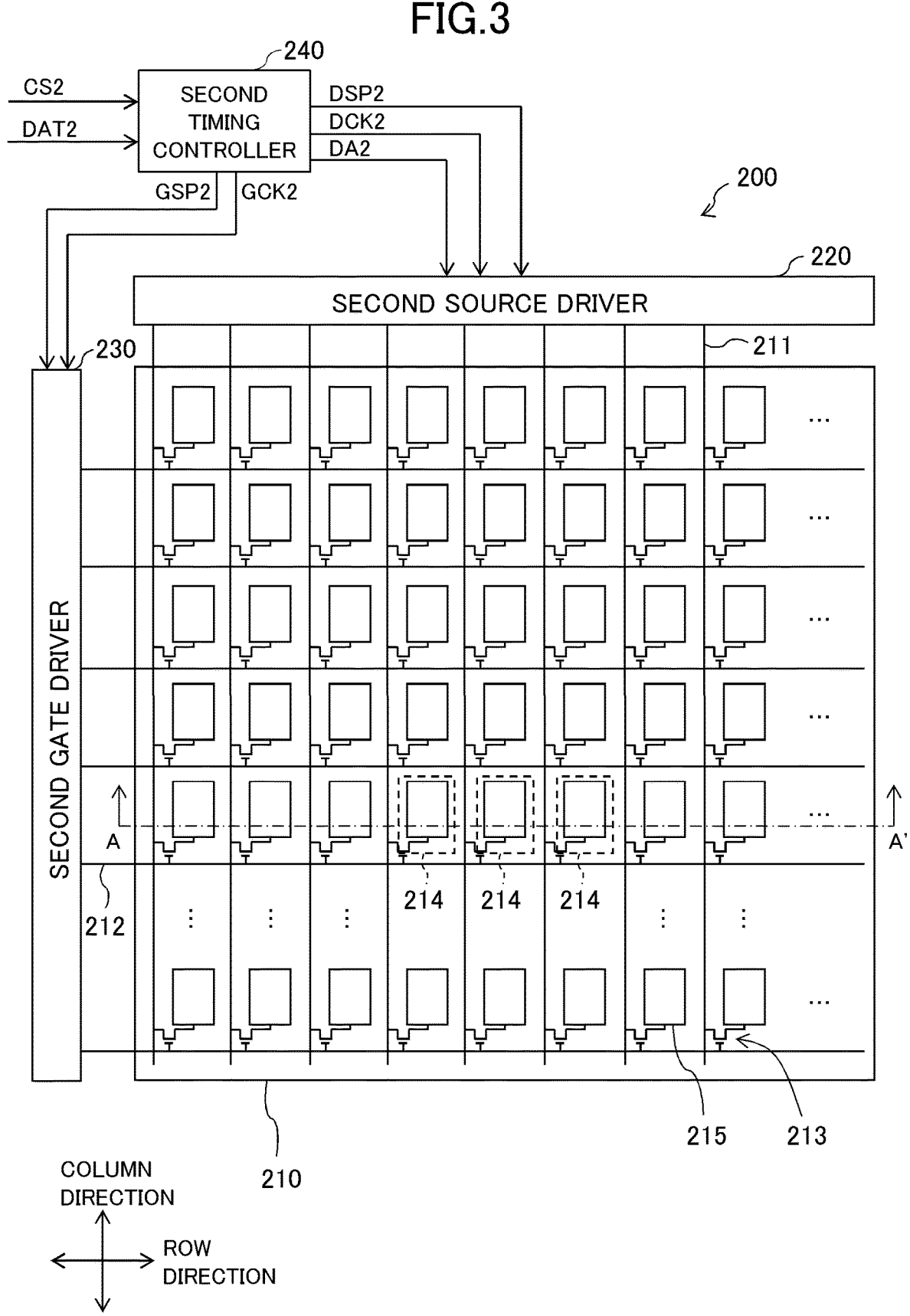

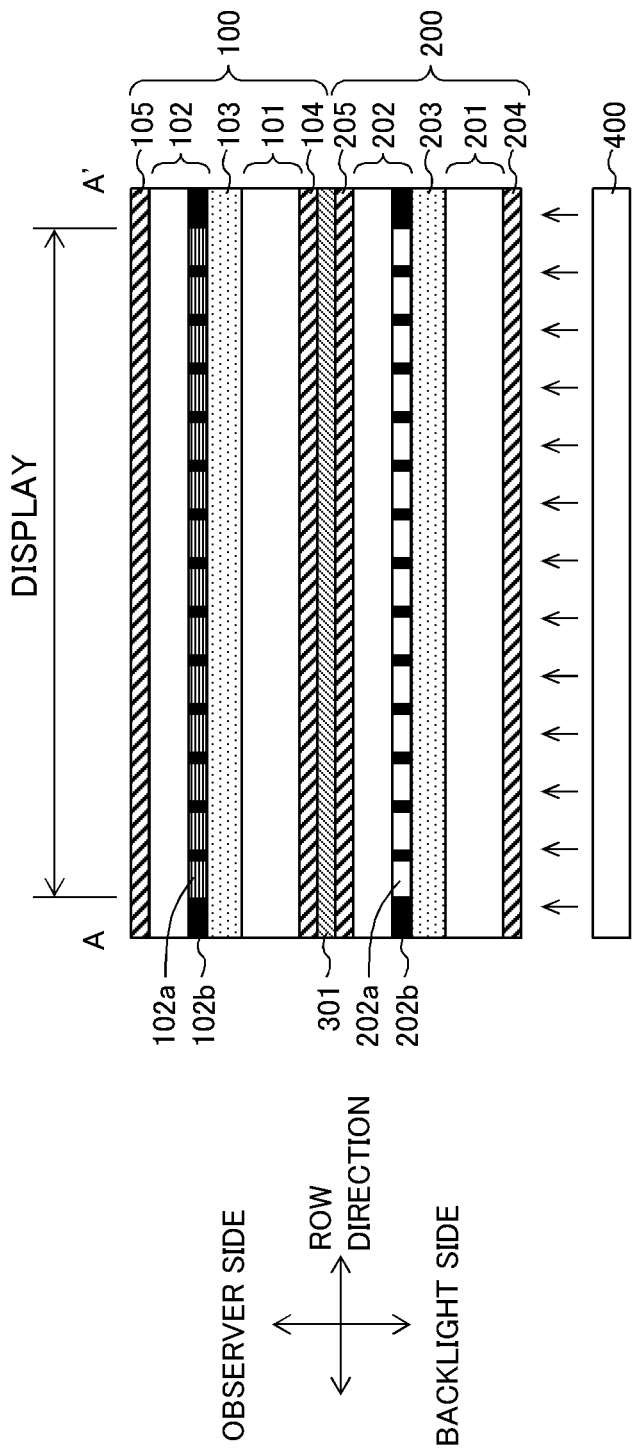

LIQUID CRYSTAL DISPLAY DEVICE

CROSS-REFERENCE TO RELATED APPLICATION

This application claims priority from Japanese application JP 2016-229154, filed Nov. 25, 2016. This Japanese application is incorporated herein by reference.

TECHNICAL FIELD

A present invention relates to a liquid crystal display device.

BACKGROUND

A technique, in which two display panels overlap each other and an image is displayed on each display panel based on an input video signal, is conventionally proposed to improve contrast of a liquid crystal display device (for example, see Unexamined Japanese Patent Publication No. 2007-310161). Specifically, for example, a color image is displayed on a front-side (observer side) display panel in two display panels disposed back and forth, and a monochrome image is displayed on a rear-side (backlight side) display panel. Thus, contrast is improved. In the liquid crystal display device, adjustment is performed such that a whole gamma value of both the display panels becomes 2.2.

SUMMARY

In the conventional liquid crystal display device, when the image is displayed in low gradation, black floating occurs and thus display quality is degraded.

The present disclosure is devised from a viewpoint of the above circumstance, and its object is to suppress the degradation of the display quality during the display of the low-gradation image in the liquid crystal display device configured by overlapping the plurality of display panels each other.

To solve the above problem, a liquid crystal display device according to the present disclosure, in which a plurality of display panels overlap each other and an image is displayed on each of the display panels, the liquid crystal display device comprises: a first display panel that displays a color image; a second display panel that displays a monochrome image; and an image processor that generates first image data corresponding to the color image and second image data corresponding to the monochrome image based on an input video signal, wherein the image processor generates the first image data and the second image data such that a graph representing transmittance of the first display panel for input gradation corresponding to the input video signal and a graph representing transmittance of the second display panel for the input gradation corresponding to the input video signal intersect each other at predetermined input gradation.

In the liquid crystal display device according to the present disclosure, the graph representing the transmittance of the first display panel may have a first inflection point and changes to an upwardly convex state in a region lower than or equal to the predetermined input gradation, and the graph representing the transmittance of the second display panel may have a second inflection point and changes to a downwardly convex state in the region lower than or equal to the predetermined input gradation.

In the liquid crystal display device according to the present disclosure, the graph representing the transmittance of the first display panel may have a third inflection point and changes to a downwardly convex state in a region higher than the predetermined input gradation, and the graph representing the transmittance of the second display panel may have a fourth inflection point and changes to a upwardly convex state in the region higher than the predetermined input gradation.

In the liquid crystal display device according to the present disclosure, the transmittance of the first display panel may be larger than the transmittance of the second display panel in a region lower than or equal to the predetermined input gradation, and the transmittance of the second display panel may be larger than the transmittance of the first display panel in a region higher than the predetermined input gradation.

In the liquid crystal display device according to the present disclosure, the image processor may include a first image data generator that decides first gradation corresponding to the first image data and a second image data generator that decides second gradation corresponding to the second image data, the second image data generator may decide the second gradation lower than the first gradation based on the input gradation corresponding to the input video signal in a region lower than or equal to the predetermined input gradation, and the first image data generator may decide the first gradation based on the second gradation decided by the second image data generator.

The liquid crystal display device according to the present disclosure may further comprises a correction table in which the second gradation is correlated with a correction value to be used for correcting the input gradation, wherein the first image data generator may refer to the correction table to obtain the correction value, which is correlated with the second gradation decided by the second image data generator, and may correct the input gradation to calculate the first gradation based on the obtained correction value.

In the liquid crystal display device according to the present disclosure, the correction value may be set such that a compound transmittance in which the transmittance of the first display panel and the transmittance of the second display panel are compounded comes close to transmittance corresponding to a predetermined gamma value.

A liquid crystal display device according to an another present disclosure, in which a plurality of display panels overlap each other and an image is displayed on each of the display panels, the liquid crystal display device comprises: a first display panel that displays a color image; a second display panel that displays a monochrome image; and an image processor that generates first image data corresponding to the color image and second image data corresponding to the monochrome image based on an input video signal, wherein the image processor generates the first image data such that a graph representing transmittance of the first display panel for input gradation corresponding to the input video signal has a first inflection point and changes to an upwardly convex state in a region lower than or equal to predetermined input gradation.

In the liquid crystal display device according to the another present disclosure, the graph representing the transmittance of the first display panel may have a second inflection point and may change to a downwardly convex state in a region higher than the predetermined input gradation.

In the liquid crystal display device according to the another present disclosure, the image processor may generate the second image data such that a graph representing transmittance of the second display panel for input gradation corresponding to the input video signal has a third inflection point and changes to a downwardly convex state in the region lower than or equal to the predetermined input gradation.

In the liquid crystal display device according to the another present disclosure, the graph representing the transmittance of the second display panel may have a fourth inflection point and may change to an upwardly convex state in the region higher than the predetermined input gradation.

A liquid crystal display device according to another present disclosure, in which a plurality of display panels overlap each other and an image is displayed on each of the display panels, the liquid crystal display device comprises: a first display panel that displays a color image; a second display panel that displays a monochrome image; and an image processor that generates second image data corresponding to the color image and second image data corresponding to the monochrome image based on an input video signal, wherein the image processor generates the second image data such that a graph representing transmittance of the second display panel for input gradation corresponding to the input video signal has a first inflection point and changes to a downward convex state in a region lower than or equal to predetermined input gradation.

In the liquid crystal display device according to the another present disclosure, the graph representing the transmittance of the second display panel may have a second inflection point and may change to an upward convex state in a region higher than the predetermined input gradation.

According to the present disclosure, it is possible to suppress the degradation of the display quality during the display of the low-gradation image in the liquid crystal display device configured by overlapping the plurality of display panels each other.

BRIEF DESCRIPTION OF THE DRAWINGS

FIG. 1 is a plan view illustrating a schematic configuration of a liquid crystal display device according to the present exemplary embodiment;

FIG. 2 is a plan view illustrating a schematic configuration of a first display panel according to the present exemplary embodiment;

FIG. 3 is a plan view illustrating a schematic configuration of a second display panel according to the present exemplary embodiment;

FIG. 4 is a sectional view taken along a line A-A' in FIGS. 2 and 3;

DETAILED DESCRIPTION

Figure 5A:
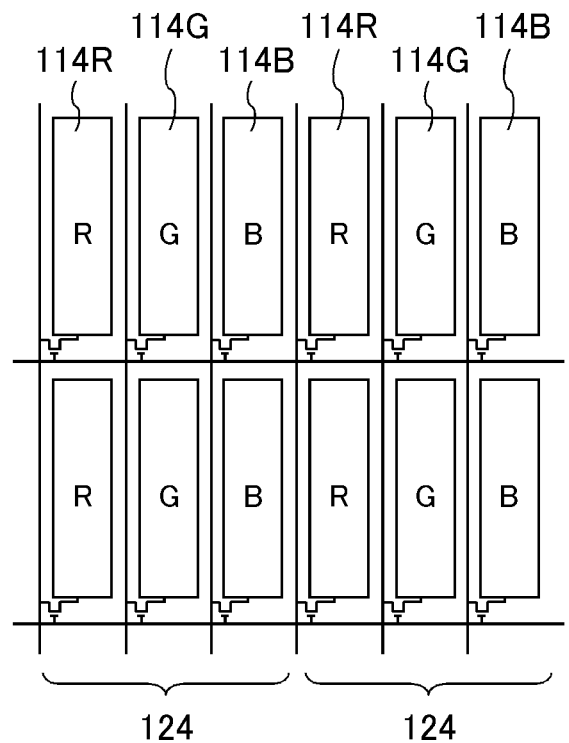
FIG. 5A is a plan view illustrating another example of pixel dispositions of the first display panels.

Hereinafter, exemplary embodiments of the present disclosure will be described with reference to the drawings. A liquid crystal display device according to the present exemplary embodiment includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. There is no limitation to a number of display panels, but it is only necessary to provide at least two display panels. When viewed from an observer side, the plurality of display panels are disposed while overlapping each other in a front-back direction. An image is displayed on each of the display panels. Liquid crystal display device 10 including two display panels will be described below by way of example.

FIG. 1 is a plan view illustrating a schematic configuration of liquid crystal display device 10 according to the present exemplary embodiment. As illustrated in FIG. 1, liquid crystal display device 10 includes first display panel 100 disposed closer to an observer (front side), second display panel 200 disposed farther away from the observer (rear side) than first display panel 100, first timing controller 140 that controls first source drivers 120 and first gate drivers 130, first source drivers 120 and first gate drivers 130 being provided in first display panel 100, second timing controller 240 that controls second source drivers 220 and second gate drivers 230, second source drivers 220 and second gate drivers 230 being provided in second display panel 200, and image processor 300 that outputs image data to first timing controller 140 and second timing controller 240. First display panel 100 displays a color image in first image display region 110 according to the input video signal, and second display panel 200 displays a monochrome image in second image display region 210 according to the input video signal. Image processor 300 receives input video signal Data transmitted from an external system (not illustrated), performs image processing (to be described later) on input video signal Data, outputs first image data DAT1 to first timing controller 140, and outputs second image data DAT2 to second timing controller 240. Image processor 300 also outputs a control signal (not illustrated in FIG. 1) such as a synchronizing signal to first timing controller 140 and second timing controller 240. First image data DAT1 is image data for displaying the color image, and second image data DAT2 is image data for displaying the monochrome image. It is also possible that first display panel 100 may displays a monochrome image in first image display region 110 and second display panel 200 may display a monochrome image in second image display region 210. A backlight (not illustrated in FIG. 1) is disposed on a rear surface side of second display panel 200. A specific configuration of image processor 300 will be described later.

FIG. 2 is a plan view illustrating a schematic configuration of first display panel 100, and FIG. 3 is a plan view illustrating a schematic configuration of second display panel 200. FIG. 4 is a sectional view taken along a line A-A' in FIGS. 2 and 3.

A configuration of first display panel 100 will be described with reference to FIGS. 2 and 4. As illustrated in FIG. 4, first display panel 100 includes thin film transistor substrate 101 (hereinafter, TFT substrate) disposed on the side of backlight 400, opposed substrate 102, which is disposed on the observer side while being opposite to TFT substrate 101, and liquid crystal layer 103 disposed between TFT substrate 101 and opposed substrate 102. Polarizing plate 104 is disposed on the side of backlight 400 of first display panel 100, and polarizing plate 105 is disposed on the observer side.

In TFT substrate 101, as illustrated in FIG. 2, a plurality of data lines 111 (source line) extending in a first direction (for example, a column direction), a plurality of gate lines 112 extending in a second direction (for example, a row direction) different from the first direction are formed, and thin film transistor 113 (hereinafter, TFT) is formed near an intersection between corresponding one of data lines 111 and corresponding one of gate lines 112. In planar view of first display panel 100, a region surrounded by two data lines 111 adjacent to each other and two gate lines 112 adjacent to each other is defined as one sub-pixel 114, and a plurality of sub-pixels 114 are arranged in a matrix form (in the row and column directions). The plurality of data lines 111 are disposed at equal intervals in the row direction, and the plurality of gate lines 112 are disposed at equal intervals in the column direction. In TFT substrate 101, pixel electrode 115 is formed in each sub-pixel 114, and one common electrode (not illustrated) common to the plurality of sub-pixels 114 is formed. A drain electrode constituting TFT 113 is electrically connected to data line 111, a source electrode constituting TFT 113 is electrically connected to pixel electrode 115, and a gate electrode constituting TFT 113 is electrically connected to gate line 112.

As illustrated in FIG. 4, a plurality of color filters 102a (colored portions) each of which corresponds to sub-pixel 114 are formed on opposed substrate 102. Each color filter 102a is surrounded by black matrix 102b blocking light transmission. For example, each color filter 102a is formed into a rectangular shape. The plurality of color filters 102a include red color filters made of a red (R color) material to transmit red light, green color filters made of a green (G color) material to transmit green light, and blue color filters made of a blue (B color) material to transmit blue light. One of the red color filters, one of the green color filters, and one of the blue color filters are repeatedly arranged in this order in the row direction, color filters having the same color are arranged in the column direction, and black matrices 102b are formed in boundaries of color filters 102a adjacent in the row and column directions. In accordance with color filters 102a, the plurality of sub-pixels 114 include red sub-pixels 114R corresponding to the color filters, green sub-pixels 114G corresponding to the green color filters, and blue sub-pixels 114B corresponding to the blue color filters as illustrated in FIG. 2. In first display panel 100, one pixel 124 is constructed with one red sub-pixel 114R, one green sub-pixel 114G, and one blue sub-pixel 114B, and a plurality of pixels 124 are arranged in a matrix form.

First timing controller 140 has a known configuration. For example, based on first image data DAT1 and first control signal CS1 (such as a clock signal, a vertical synchronizing signal, and a horizontal synchronizing signal), which are output from image processor 300, first timing controller 140 generates various timing signals (data start pulse DSP1, data clock DCK1, gate start pulse GSP1, and gate clock GCK1) to control first image data DA1 and drive of first source driver 120 and first gate driver 130 (see FIG. 2). First timing controller 140 outputs first image data DA1, data start pulse DSP1, and data clock DCK1 to first source driver 120, and outputs gate start pulse GSP1 and gate clock GCK1 to first gate driver 130.

First source driver 120 outputs a data signal (data voltage) corresponding to first image data DA1 to data lines 111 based on data start pulse DSP1 and data clock DCK1. First gate driver 130 outputs a gate signal (gate voltage) to gate lines 112 based on gate start pulse GSP1 and gate clock GCK1.

The data voltage is supplied from first source driver 120 to each data line 111, and the gate voltage is supplied from first gate driver 130 to each gate line 112. Common voltage $V_{com}$ is supplied from a common driver (not illustrated) to the common electrode. When the gate voltage (gate-on voltage) is supplied to gate line 112, TFT 113 connected to gate line 112 is turned on, and the data voltage is supplied to pixel electrode 115 through data line 111 connected to said TFT 113. An electric field is generated by a difference between the data voltage supplied to pixel electrode 115 and common voltage $V_{com}$ supplied to the common electrode. The liquid crystal is driven by the electric field, and transmittance of backlight 400 is controlled, thereby displaying an image. In first display panel 100, the color image is displayed by supply of a desired data voltage to data line 111 connected to pixel electrode 115 of each of red sub-pixel 114R, green sub-pixel 114G, and blue sub-pixel 114B. A known configuration can be applied to first display panel 100.

Next, a configuration of second display panel 200 will be described below with reference to FIGS. 3 and 4. As illustrated in FIG. 4, second display panel 200 includes TFT substrate 201 disposed on the side of backlight 400, opposed substrate 202, which is disposed on the observer side while being opposite to TFT substrate 201, and liquid crystal layer 203 disposed between TFT substrate 201 and opposed substrate 202. Polarizing plate 204 is disposed on the side of backlight 400 of second display panel 200, and polarizing plate 205 is disposed on the observer side. Diffusion sheet 301 and/or adhesive sheet are disposed between polarizing plate 104 of first display panel 100 and polarizing plate 205 of second display panel 200.

Figure 5B:
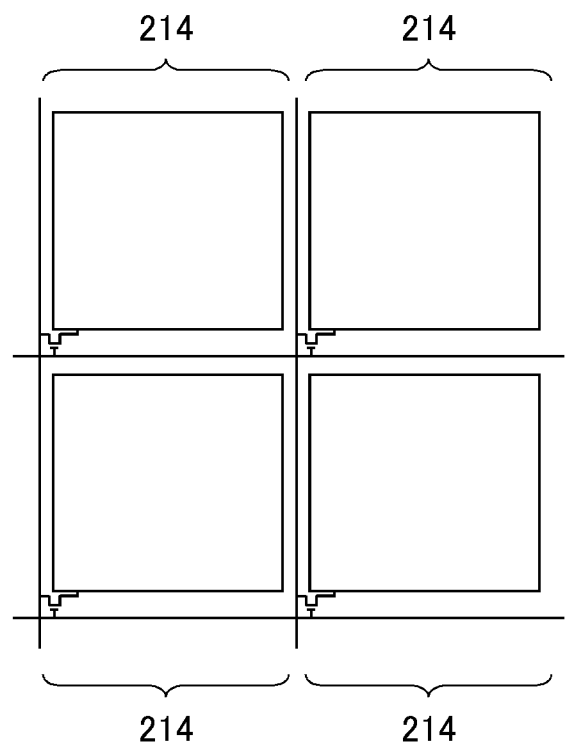
FIG. 5B is a plan view illustrating another example of pixel dispositions of the second display panels.

In TFT substrate 201, as illustrated in FIG. 3, a plurality of data lines 211 (source lines) extending in the column direction, a plurality of gate lines 212 extending in the row direction are formed, and TFT 213 is formed near an intersection between corresponding one of data lines 211 and corresponding one of gate lines 212. In planar view of second display panel 200, a region surrounded by two data lines 211 adjacent to each other and two gate lines 212 adjacent to each other is defined as one pixel 214, and a plurality of pixels 214 are arranged in a matrix form (the row direction and the column direction). The plurality of data lines 211 are disposed at equal intervals in the row direction, and the plurality of gate lines 212 are disposed at equal intervals in the column direction. In TFT substrate 201, pixel electrode 215 is formed in each pixel 214, and one common electrode (not illustrated) common to the plurality of pixels 214 is formed. A drain electrode constituting TFT 213 is electrically connected to data line 211, a source electrode constituting TFT 213 is electrically connected to pixel electrode 215, and a gate electrode constituting TFT 213 is electrically connected to gate line 212. Sub-pixel 114 of first display panel 100 and pixel of second display panel 200 are disposed on one-to-one correspondence, and overlap each other in planar view. For example, red sub-pixel 114R, green sub-pixel 114G and blue sub-pixel 114B, which constitute pixel 124 in FIG. 2, and three pixels 214 in FIG. 3 overlap each other in planar view. It is also possible that a relationship between sub-pixels 114 of first display panel 100 and pixels 214 of second display panel 200 is three to one. As illustrated in FIGS. 5A and 5B, one pixel 124 (see FIG. 5A) composed of red sub-pixel 114R, green sub-pixel 114G and blue sub-pixel 114B of first display panel 100 may overlap one pixel 214 (see FIG. 5B) of second display panel 200 in planar view.

As illustrated in FIG. 4, in opposed substrate 202, black matrix 202b blocking light transmission is formed at a position corresponding to a boundary of each pixel 214. The color filter is not formed in region 202a surrounded by black matrix 202b. For example, an overcoat film is formed in region 202a.

Second timing controller 240 has a known configuration. For example, based on second image data DAT2 and second control signal CS2 (such as a clock signal, a vertical synchronizing signal, and a horizontal synchronizing signal), which are output from image processor 300, second timing controller 240 generates various timing signals (data start pulse DSP2, data clock DCK2, gate start pulse GSP2, and gate clock GCK2) to control second image data DA2 and drive of second source driver 220 and second gate driver 230 (see FIG. 3). Second timing controller 240 outputs second image data DA2, data start pulse DSP2, and data clock DCK2 to second source driver 220, and outputs gate start pulse GSP2 and gate clock GCK2 to second gate driver 230.

Second source driver 220 outputs the data voltage corresponding to second image data DA2 to data lines 211 based on data start pulse DSP2 and data clock DCK2. Second gate driver 230 outputs the gate voltage to gate lines 212 based on gate start pulse GSP2 and gate clock GCK2.

The data voltage is supplied from second source driver 220 to each data line 211, and the gate voltage is supplied from second gate driver 230 to each gate line 212. Common voltage $V_{com}$ is supplied from the common driver to the common electrode. When the gate voltage (gate-on voltage) is supplied to gate line 212, TFT 213 connected to gate line 212 is turned on, and the data voltage is supplied to pixel electrode 215 through data line 211 connected to said TFT 213. An electric field is generated by a difference between the data voltage supplied to pixel electrode 215 and common voltage $V_{com}$ supplied to the common electrode. The liquid crystal is driven by the electric field, and transmittance of backlight 400 is controlled, thereby displaying an image. The monochrome image is displayed on second display panel 200. A known configuration can be applied to second display panel 200.

Figure 6:
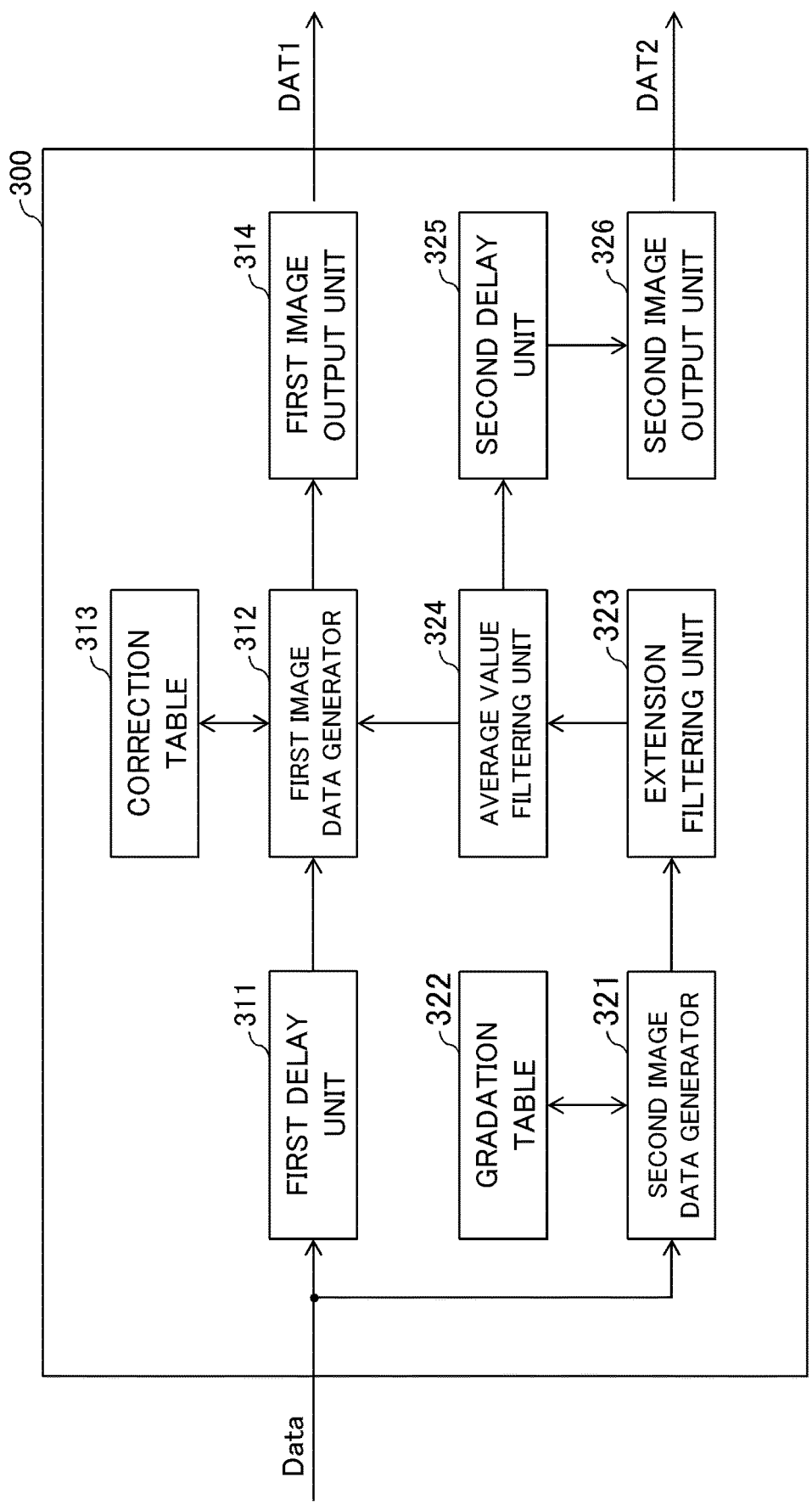
FIG. 6 is a block diagram illustrating a specific configuration of an image processor according to an exemplary embodiment.

FIG. 6 is a block diagram illustrating a specific configuration of image processor 300. Image processor 300 includes first delay unit 311, first image data generator 312, correction table 313, first image output unit 314, second image data generator 321, gradation table 322, extension filter processor 323, average value filter processor 324, second delay unit 325, and second image output unit 326. Image processor 300 performs image processing (to be described later) based on input video signal Data, and generates first image data DAT1 (color image data) for first display panel 100 and second image data DAT2 (monochrome image data) for second display panel 200. Image processor 300 generates first image data DAT1 and second image data DAT2 such that a compound gamma value (γ value) of the display image in which the color image and the monochrome image are compounded becomes a desired value (for example, γ=2.2).

When receiving input video signal Data transmitted from an external system, image processor 300 transfers input video signal Data to first delay unit 311 and second image data generator 321. Input video signal Data includes luminance information (gradation information) and color information. The color information is information designating color. For example, each of a plurality of colors including an R color, a G color, and a B color can be expressed by 0 to 1023 values in a case where input video signal Data is 10 bits. Each of the plurality of colors including the R color, the G color, and the B color can be expressed by 0 to 255 values in a case where input video signal Data is 8 bits. The plurality of colors includes at least the R color, the G color, and the B color, and may further include a W (white) color and/or a Y (yellow) color. The case where input video signal Data is 10 bits while the plurality of colors includes the R color, the G color, and the B color will be described below as an example. In the case where input video signal Data is 10 bits, the gradation is expressed by 0 to 1023 steps.

Figure 7A:
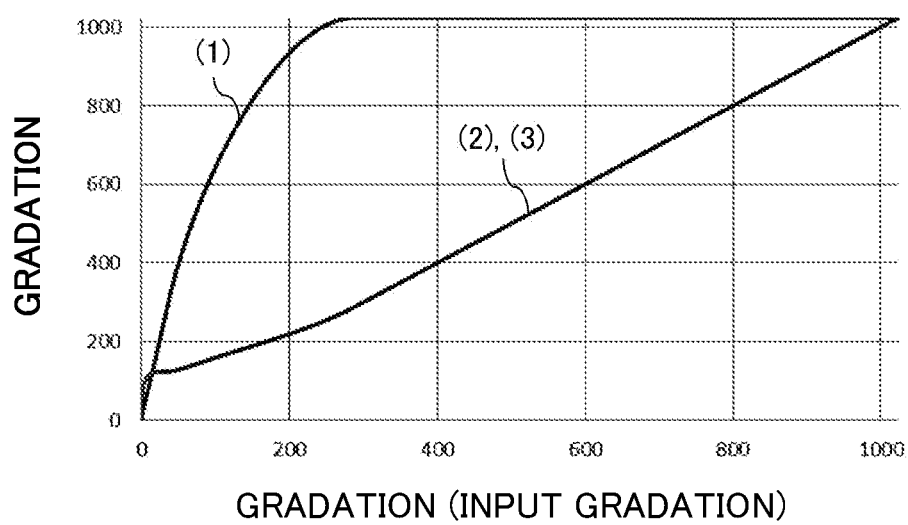
FIG. 7A is a graph representing a relationship between an input gradation and first and second gradations.
Figure 7B:
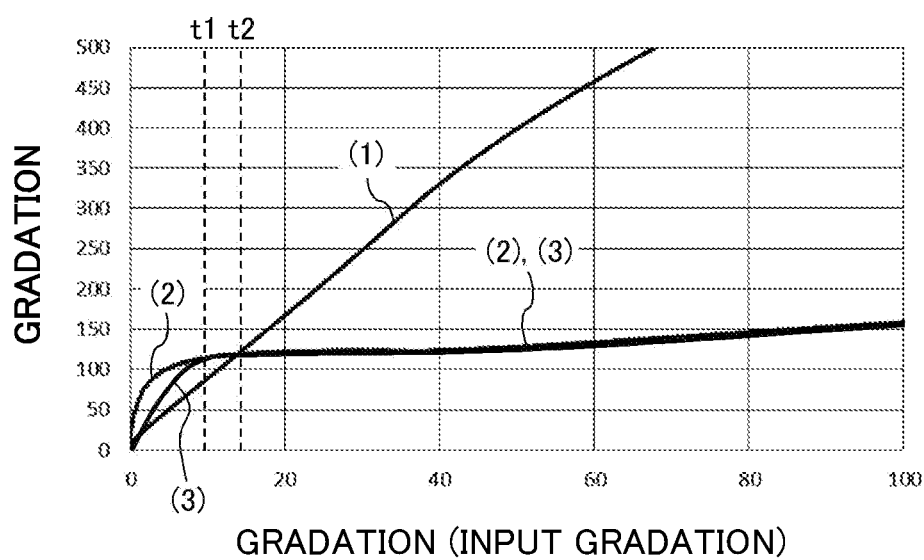
FIG. 7B is an enlarged view of a low-gradation region in FIG. 7A.

When obtaining input video signal Data, second image data generator 321 refers to gradation table 322 (gradation LUT) to decide the gradation (second gradation) corresponding to the monochrome image data. Graph (1) in FIGS. 7A and 7B represents an example of gradation table 322. FIG. 7B is an enlarged view of a low-gradation region in FIG. 7A. In gradation table 322 (graph (1) in FIGS. 7A and 7B), the gradation (input gradation) corresponding to input video signal Data is correlated with the gradation (second gradation) corresponding to the monochrome image data. For example, in a case where the input gradation is "2-step gradation", second image data generator 321 decides "26-step gradation" correlated with "2-step gradation" as the second gradation.

When obtaining the monochrome image data (second gradation) from second image data generator 321, extension filter processor 323 performs extension filtering for extending a high-luminance region on the monochrome image data. Specifically, extension filter processor 323 performs processing (extension filtering) for setting the luminance of each pixel (target pixel) to the maximum luminance in a predetermined filter size. The high-luminance regions (for example, a white region) extend as a whole through the extension filtering. The filter size is not limited to the 11-by-11 pixel region. The filter shape is not limited to the square shape, but the filter may be formed into a circular shape.

When obtaining the monochrome image data that has been subject to the extension filtering, average value filter processor 324 performs smoothing on the monochrome image data using an average value filter common to all pixels 214 in each frame. For example, using the 11-by-11 pixel region configured by each 11 pixels on the right, left, top, and bottom around each pixel 214 (target pixel) as the filter size, average value filter processor 324 performs processing for setting a luminance of target pixel 214 to the average luminance in the filter size. Although the filter size is not limited to the 11-by-11 pixel region, all pixels 214 are set to the common filter size in each frame. The filter is not limited to the square shape, but the filter may be formed into a circular shape. A high-frequency component is deleted through the smoothing, so that a luminance change can be smoothed. Average value filter processor 324 outputs the monochrome image data that has been subject to the smoothing to first image data generator 312 and second delay unit 325.

Based on the monochrome image data (second gradation) obtained from average value filter processor 324 and input video signal Data obtained from first delay unit 311, first image data generator 312 decides the gradation (first gradation) of the color image displayed on first display panel 100. Specifically, when obtaining the second gradation, first image data generator 312 transforms the second gradation into pre-correction gradation using the following equation (1).

$$\text{Pre-correction gradation} = 1023 \times \text{input gradation}/\text{second gradation} \quad (1)$$

For example, in a case where the input gradation is "2-step gradation" while the second gradation is "26-step gradation" (graph (1) in FIGS. 7A and 7B), the pre-correction gradation becomes "79-step gradation" in accordance with the equation (1). Graph (2) in FIGS. 7A and 7B represents the pre-correction gradation calculated using the equation (1) in a case where gradation table 322 is set to graph (1) in FIGS. 7A and 7B.

Figure 8:
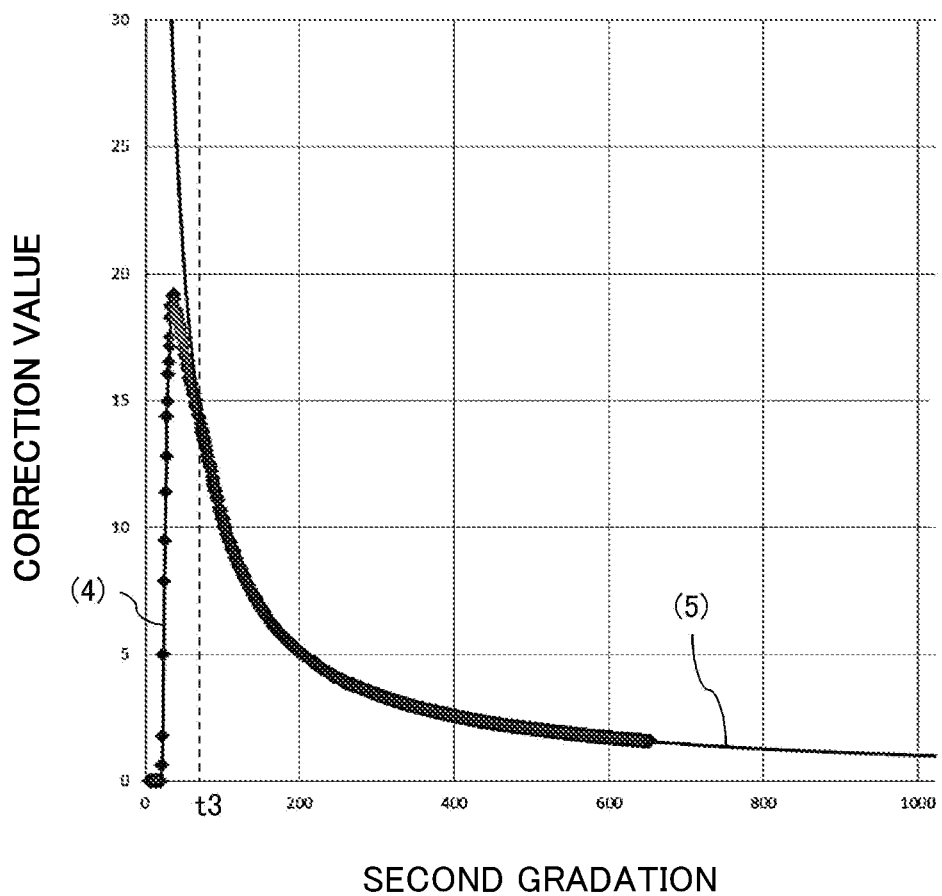
FIG. 8 is a graph representing a relationship between an input gradation and a correction gradation.

Then, first image data generator 312 refers to correction table 313 (correction LUT) to obtain a correction value to be used for correcting the pre-correction gradation in order to calculate the first gradation. Graph (4) in FIG. 8 illustrates an example of correction table 313. In correction table 313 (graph (4) in FIG. 8), the second gradation and the correction value are correlated with each other. For example, in a case where the second gradation is "26-step gradation", first image data generator 312 obtains "9.5" correlated with "26-step gradation" as the correction value. The correction value (graph (4)) of correction table 313 is set according to an inverse number (graph (5)) of the set gamma value (2.2) in a region higher than the low-gradation region of 0-step gradation to t3-step gradation, and is set to a value for correcting the pre-correction gradation to a lower level in the low-gradation region of 0-step gradation to t3-step gradation.

Then, first image data generator 312 decides the first gradation (post-correction gradation) based on the obtained correction value (gradation correction processing). Specifically, first image data generator 312 decides a value obtained by multiplying the input gradation by the correction value as the first gradation. For example, in a case where the input gradation is "2-step gradation" while the correction value is "9.5" (graph (4) in FIG. 8), the first gradation becomes "19-step gradation" (=2-step gradation×9.5-step gradation). Graph (3) in FIGS. 7A and 7B represents the first gradation, which is calculated in a case where gradation table 322 is set to graph (1) in FIGS. 7A and 7B while correction table 313 is set to graph (4) in FIG. 8. As illustrated in FIGS. 7A and 7B, the first gradation (graph (3)) is lower than the pre-correction gradation (graph (2)) in a region lower than or equal to predetermined gradation (t1-step gradation), and is equal to the pre-correction gradation in a region higher than the predetermined gradation (t1-step gradation). First image data generator 312 outputs the generated color image data (first gradation) to first image output unit 314.

Second delay unit 325 outputs the monochrome image data (second gradation) that has been subject to the smoothing to second image output unit 326 in synchronization with timing of outputting the color image data (first gradation) in first image data generator 312.

First image output unit 314 outputs the color image data (first gradation) to first timing controller 140 as first image data DAT1. Second image output unit 326 outputs the monochrome image data (second gradation) to second timing controller 240 as second image data DAT2. Image processor 300 outputs first control signal CS1 to first timing controller 140, and outputs second control signal CS2 to second timing controller 240 (see FIGS. 2 and 3).

As described above, in liquid crystal display device 10 according to the present exemplary embodiment, image processor 300 sets the first gradation and the second gradation such that the first gradation (graph (3)) is higher than the second gradation (graph (1)) in the region (the low-gradation region of 0-step gradation to t2-step gradation) lower than or equal to the predetermined gradation (t2-step gradation), and such that the second gradation (graph (1)) is higher than the first gradation (graph (2)) in the region higher than the predetermined gradation (t2-step gradation) as illustrated in FIGS. 7A and 7B. When attention is paid to the gradation characteristic in FIGS. 7A and 7B, graph (3) representing the gradation characteristic corresponding to first image data DAT1 (first gradation) for first display panel 100 has an inflection point and changes to a convex state in the region lower than or equal to the predetermined input gradation (t2-step gradation).

Figure 9A:
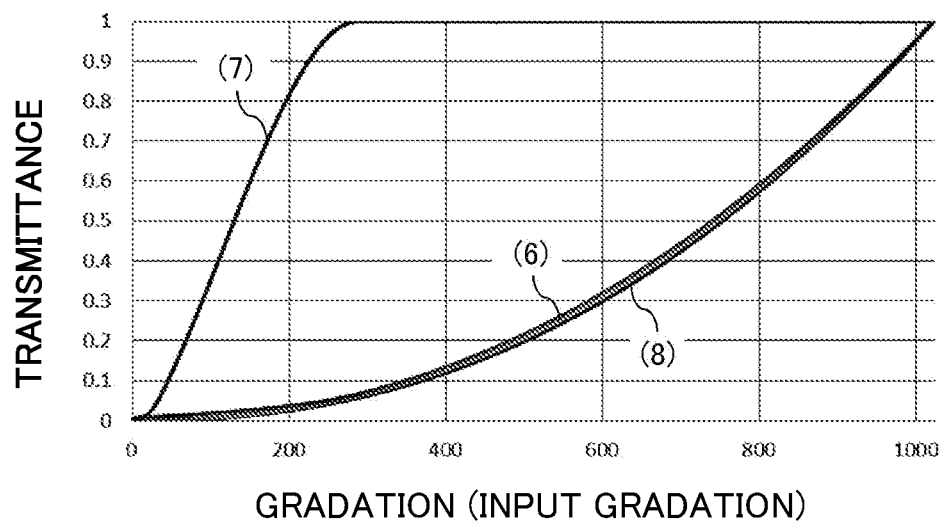
FIG. 9A is a graph representing a relationship between an input gradation and first and second transmittances.
Figure 9B:
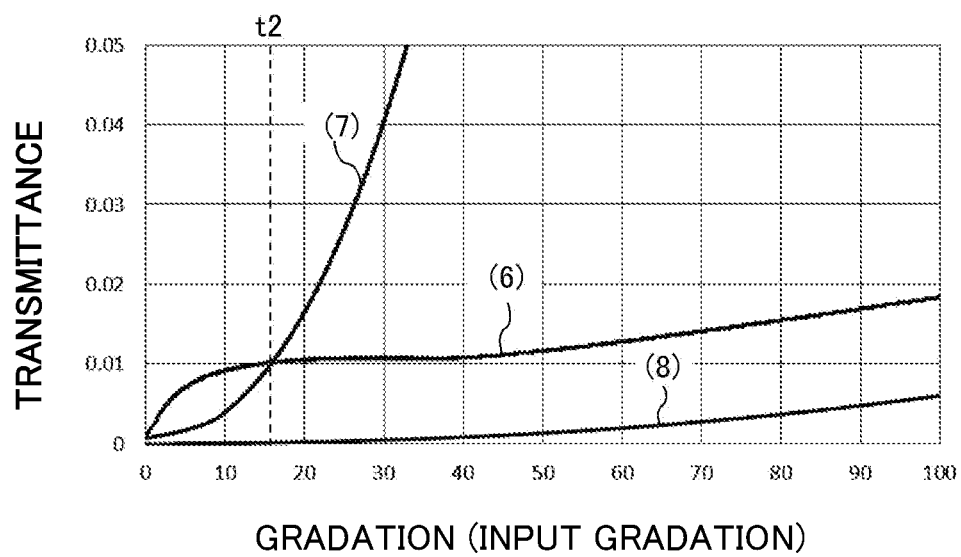
FIG. 9B is an enlarged view of a low-gradation region in FIG. 9A.

FIGS. 9A and 9B are graphs representing first transmittance (graph (6)) of first display panel 100, second transmittance (graph (7)) of second display panel 200, and gamma transmittance (graph (8)) (gamma characteristic) corresponding to the gamma value (γ=2.2) for the gradation (the input gradation) corresponding to input video signal Data. FIG. 9B is an enlarged view of a low-gradation region in FIG. 9A. Graph (6) (the first transmittance) in FIGS. 9A and 9B represents transmittance in a case where the image is displayed based on the pre-correction gradation (graph (2) in FIGS. 7A and 7B) of first display panel 100. As illustrated in FIG. 9B, the first transmittance (graph (6)) is larger than the second transmittance (graph (7)) in the region (the low-gradation region of 0-step gradation to t2-step gradation) lower than or equal to the predetermined input gradation (t2-step gradation), and the second transmittance (graph (7)) is larger than the first transmittance (graph (6)) in the region higher than the predetermined input gradation (t2-step gradation). When attention is paid to the transmittance characteristic in FIGS. 9A and 9B, the graph representing the first transmittance of first display panel 100 had a first inflection point (an upwardly convex portion) in the region lower than or equal to the predetermined input gradation (t2-step gradation), and has a second inflection point (a downwardly convex portion) in the region higher than the predetermined input gradation (t2-step gradation). That is, the graph (graph (6)) representing the first transmittance rises steeply in the region lower than or equal to the predetermined input gradation (t2-step gradation), and then changes gently. The graph representing the second transmittance of second display panel 200 has a third inflection point (a downwardly convex portion) in the region lower than or equal to the predetermined input gradation (t2-step gradation), and has a fourth inflection point (an upwardly convex portion) in the region higher than the predetermined input gradation. That is, the graph (graph (7)) representing the second transmittance changes gently in the region lower than or equal to the predetermined input gradation (t2-step gradation), and then rises steeply. The graph representing the first transmittance of first display panel 100 and the graph representing the second transmittance of second display panel 200 change so as to intersect each other at the predetermined input gradation (t2-step gradation).

Figure 10:
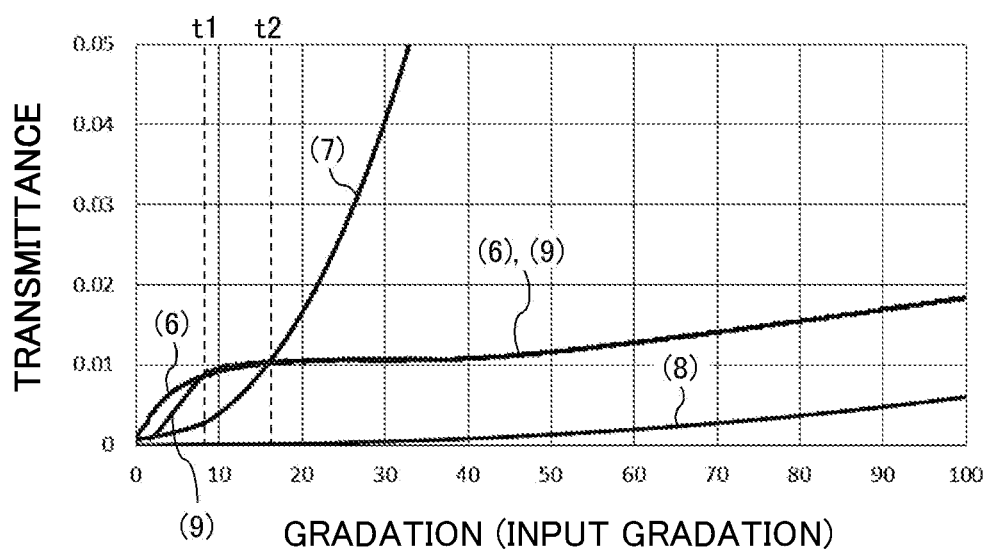
FIG. 10 is a graph representing a relationship between an input gradation and first, second and correction transmittances.

In FIG. 10, graph (9), which represents correction transmittance in a case where the image is displayed based on the first gradation (graph (3) in FIGS. 7A and 7B) of first display panel 100, is added to FIG. 9B. Similarly to the gradation characteristic in FIG. 7B, the correction transmittance in graph (9) is lower than the first transmittance in graph (6)) in the region (the low-gradation region of 0-step gradation to t1-step gradation) lower than or equal to predetermined input gradation (t1-step gradation). The correction transmittance in graph (9) is equal to the first transmittance in the region higher than the predetermined input gradation (the t1-step gradation).

Figure 11:
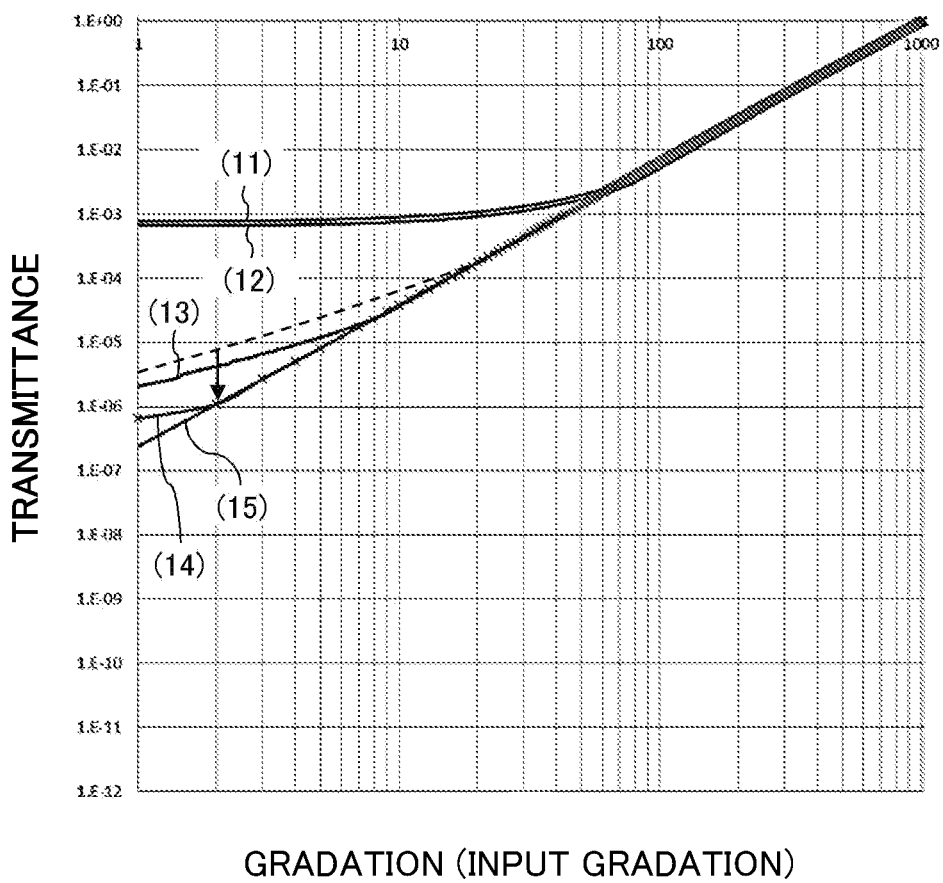
FIG. 11 is a graph representing a compound transmittance composed by a transmittance of a first display panel in FIG. 10 and a transmittance of a second display panel.

FIG. 11 is a graph representing a compound transmittance in which transmittance (the first transmittance, the correction transmittance) of first display panel 100 in FIG. 10 and the second transmittance of the second display panel 200 are compounded. In FIG. 11, the compound transmittance is expressed by a double logarithmic chart. In FIG. 11, graph (11) represents estimated transmittance of first display panel 100, and graph (12) represents estimated transmittance of second display panel 200. Graph (13) represents transmittance (pre-correction compound transmittance) in which the first transmittance (graph (6) in FIGS. 9A and 9B) of first display panel 100 and the second transmittance (graph (7) in FIGS. 9A and 9B) of second display panel 200 are compounded. Further, graph (14) represents transmittance (post-correction compound transmittance) in which the correction transmittance (graph (9) in FIG. 10) of first display panel 100 and the second transmittance (graph (7) in FIG. 10) of second display panel 200 are compounded. Graph (15) represents gamma transmittance (gamma characteristic) corresponding to the gamma value (γ=2.2).

Figure 12:
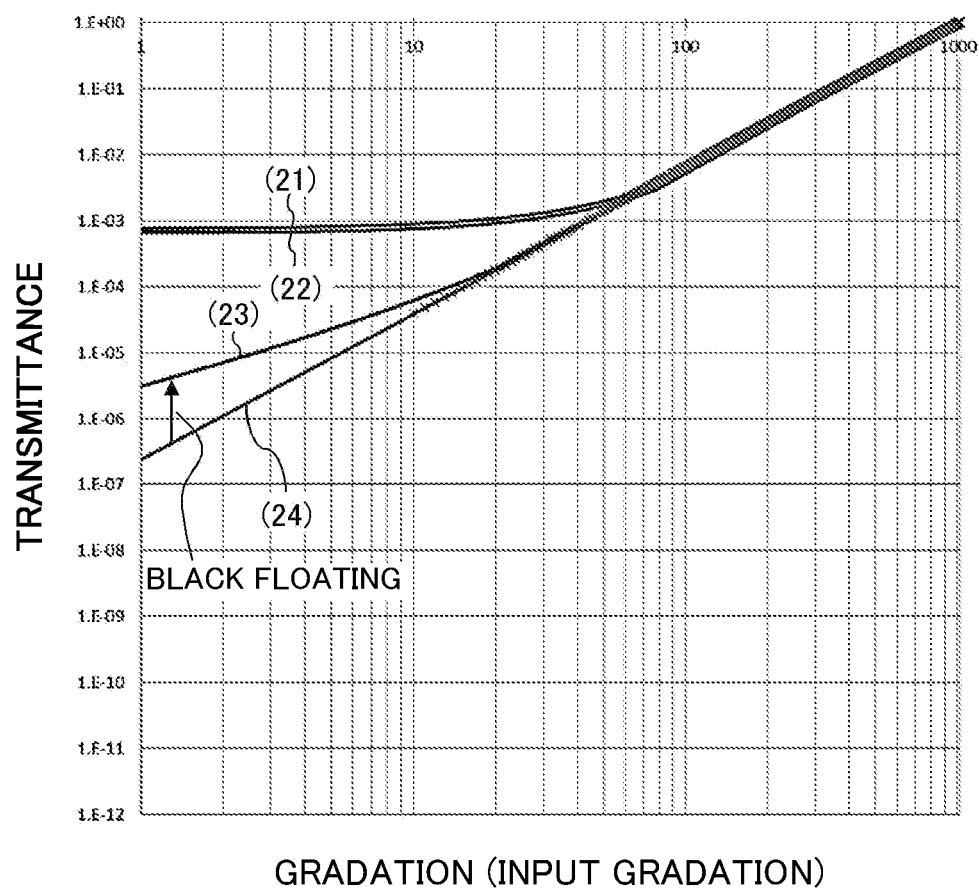
FIG. 12 is a graph representing a comparative example of the graph in FIG. 11.
Figure 13:
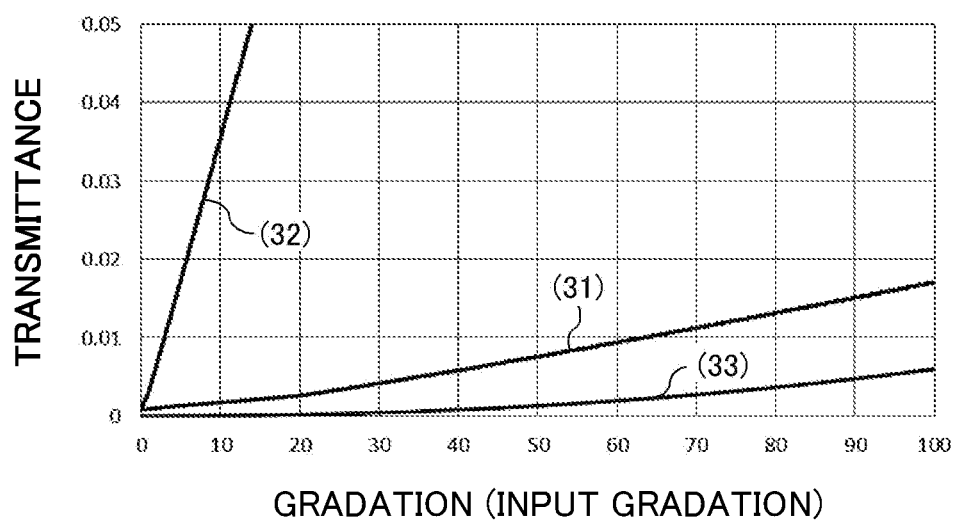
FIG. 13 is a graph representing transmittance of the first display panel, transmittance of the second display panel and gamma transmittance corresponding to the input gradation in the liquid crystal display device of the comparative example.

FIG. 12 is a graph representing a comparative example of the graph in FIG. 11. FIG. 12 illustrates compound transmittance in which the transmittance of the first display panel and the transmittance of the second display panel are compounded in a liquid crystal display device of the comparative example. In FIG. 12, graph (21) represents estimated transmittance of the first display panel of the comparative example, graph (22) represents estimated transmittance of the second display panel of the comparative example, and graph (23) represents transmittance (compound transmittance) in which the transmittance of the first display panel and the transmittance of the second display panel are compounded. Graph (24) represents the transmittance (the gamma transmittance) (the gamma characteristic) corresponding to the gamma value (γ=2.2), and is identical to graph (15) in FIG. 11. FIG. 13 is a graph representing transmittance (graph (31)) of the first display panel, transmittance (graph (32)) of the second display panel, and transmittance (graph (33)) (gamma characteristic) corresponding to the gamma value (γ=2.2) for the gradation (input gradation) corresponding to the input video signal in the liquid crystal display device of the comparative example. As illustrated in FIG. 13, in all the steps of the gradation, the transmittance (graph (32) in FIG. 13) of the second display panel is larger than the transmittance (graph (31) in FIG. 13) of the first display panel.

In the comparative example of FIG. 12, the compound transmittance (graph (23)) is largely separated from the gamma transmittance (graph (24)) in the low-gradation region. Therefore, the black floating occurs and thus degrades the display quality. On the other hand, in liquid crystal display device 10 according to the present exemplary embodiment, in comparison with the comparative example (the graph indicated by a dotted line), the compound transmittance (the post-correction compound transmittance of graph (14)) can brought close to the gamma transmittance in the low-gradation region as illustrated in FIG. 11. For example, the compound transmittance can be approximated to the gamma transmittance (the gamma characteristic) up to "2-step gradation". When the image is displayed in the low gradation, the gradation allocated to first display panel 100 is lower than the gradation allocated to the first display panel of the comparative example, and the gradation allocated to second display panel 200 is higher than the gradation allocated to the second display panel of the comparative example. Therefore, the degradation of the display quality can be suppressed because the black floating is suppressed in comparison with the comparative example. In a case where the gradation correction processing is not performed in first image data generator 312, the color image is displayed based on the pre-correction gradation. Even in this case, as illustrated in graph (13) of FIG. 11, in comparison with the comparative example (the graph indicated by the dotted line), the compound transmittance (pre-correction compound transmittance) can be brought close to the gamma transmittance (gamma characteristic) in the low-gradation region as illustrated in FIG. 11.

As described above, in a case where the predetermined gamma characteristic (for example, γ=2.2) is obtained by the compound of the two display panels, liquid crystal display device 10 according to the present exemplary embodiment sets the gradation (the second gradation) of second display panel 200 such that the transmittance of first display panel 100 is larger than the transmittance of second display panel 200 in the region lower than or equal to the predetermined gradation, and such that the transmittance of second display panel 200 is larger than the transmittance of first display panel 100 in the region higher than the predetermined gradation. Based on the correction value (see FIG. 8) corresponding to the set second gradation, the input gradation is corrected and the first gradation is calculated such that the compound transmittance comes close to the predetermined gamma transmittance. At this time, it is preferable that the second gradation is set lower in the predetermined gradation or less. Therefore, because an adjustment width (a range of reduction) of the first gradation calculated by the correction can be increased, the compound transmittance is easily brought close to the gamma characteristic.

Liquid crystal display device 10 according to the present exemplary embodiment is not limited to the above configuration. For example, input video signal Data may be 8 bits. In this case, the gradation is expressed by 0 to 255 steps.

In the above, the specific embodiments of the present application have been described, but the present application is not limited to the above-mentioned embodiments, and various modifications may be made as appropriate without departing from the spirit of the present application.

What is claimed is:

1. A liquid crystal display device comprising:
   a first display panel that displays a first image;
   a second display panel that displays a second image; and
   an image processor that generates first image data corresponding to the first image and second image data corresponding to the second image based on an input video signal,
   wherein the liquid crystal display device is configured so that the transmittance of the first display panel is larger than the transmittance of the second display panel when a value of luminance information of the input video signal is less than a first value, and the transmittance of the second display panel is larger than the transmittance of the first display panel when the value of the luminance information of the input video signal is more than the first value, wherein the image processor includes a first image data generator that decides first gradation corresponding to the first image data and a second image data generator that decides second gradation corresponding to the second image data, the second image data generator decides the second gradation lower than the first gradation based on the input gradation corresponding to the input video signal when a value of luminance information of the input video signal is less than the first value.

2. The liquid crystal display device according to claim 1, wherein the first image data generator decides the first gradation based on the second gradation decided by the second image data generator.

3. The liquid crystal display device according to claim 2, further comprising a correction table in which the second gradation is correlated with a correction value to be used for correcting the input gradation, wherein the first image data generator refers to the correction table to obtain the correction value, which is correlated with the second gradation decided by the second image data generator, and corrects the input gradation to calculate the first gradation based on the obtained correction value.

4. The liquid crystal display device according to claim 3, wherein the correction value is set such that a compound transmittance, in which the transmittance of the first display panel and the transmittance of the second display panel are compounded, comes close to transmittance corresponding to a predetermined gamma value.

5. The liquid crystal display device according to claim 1, wherein
the second display panel is disposed closer to a side of a backlight than the first display panel.

6. The liquid crystal display device according to claim 1, wherein
the first display panel displays a color image, and
the second display panel displays a monochrome image.

* * * * *